United States Patent Office 2,905,627
Patented Sept. 22, 1959

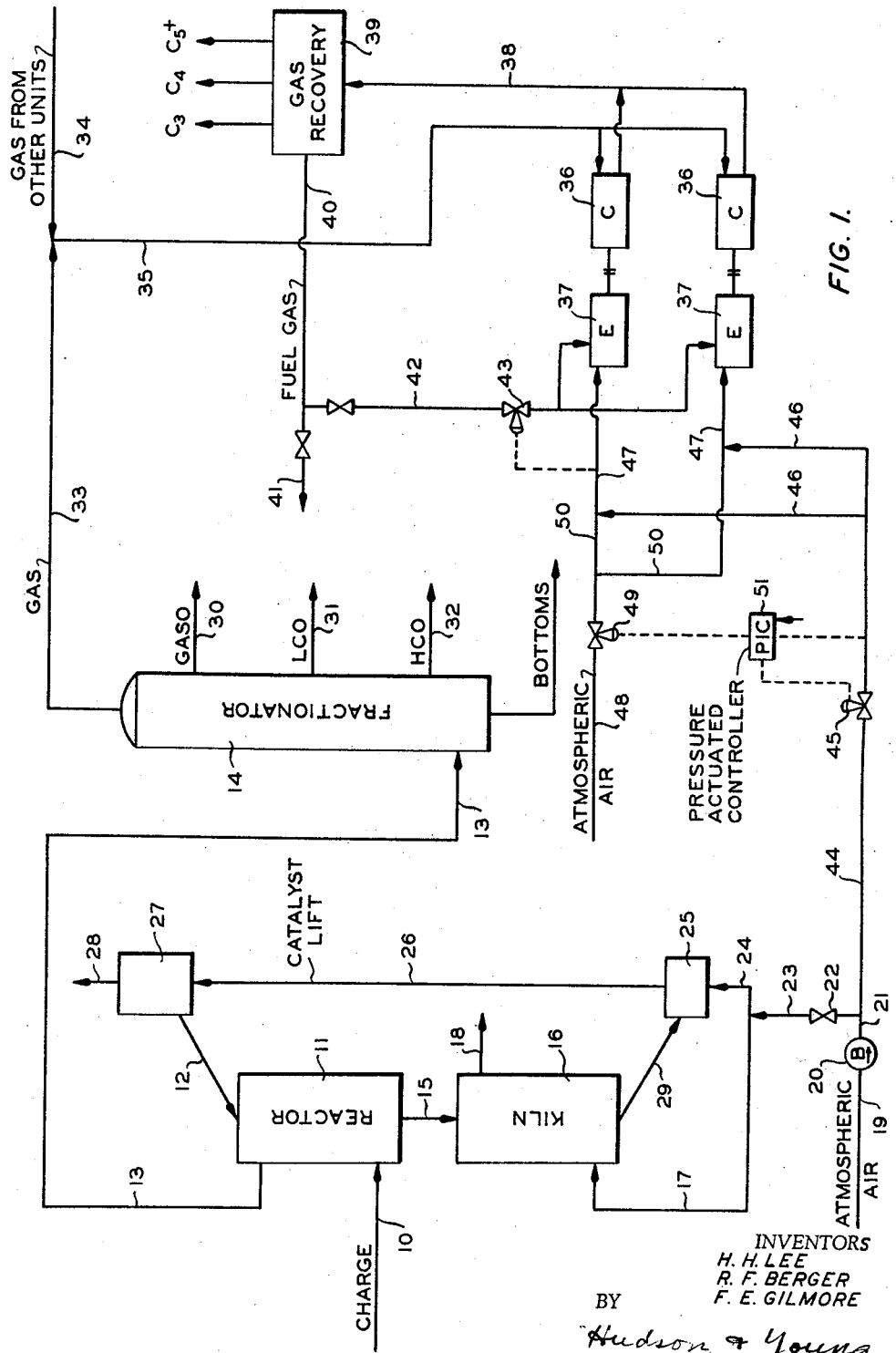

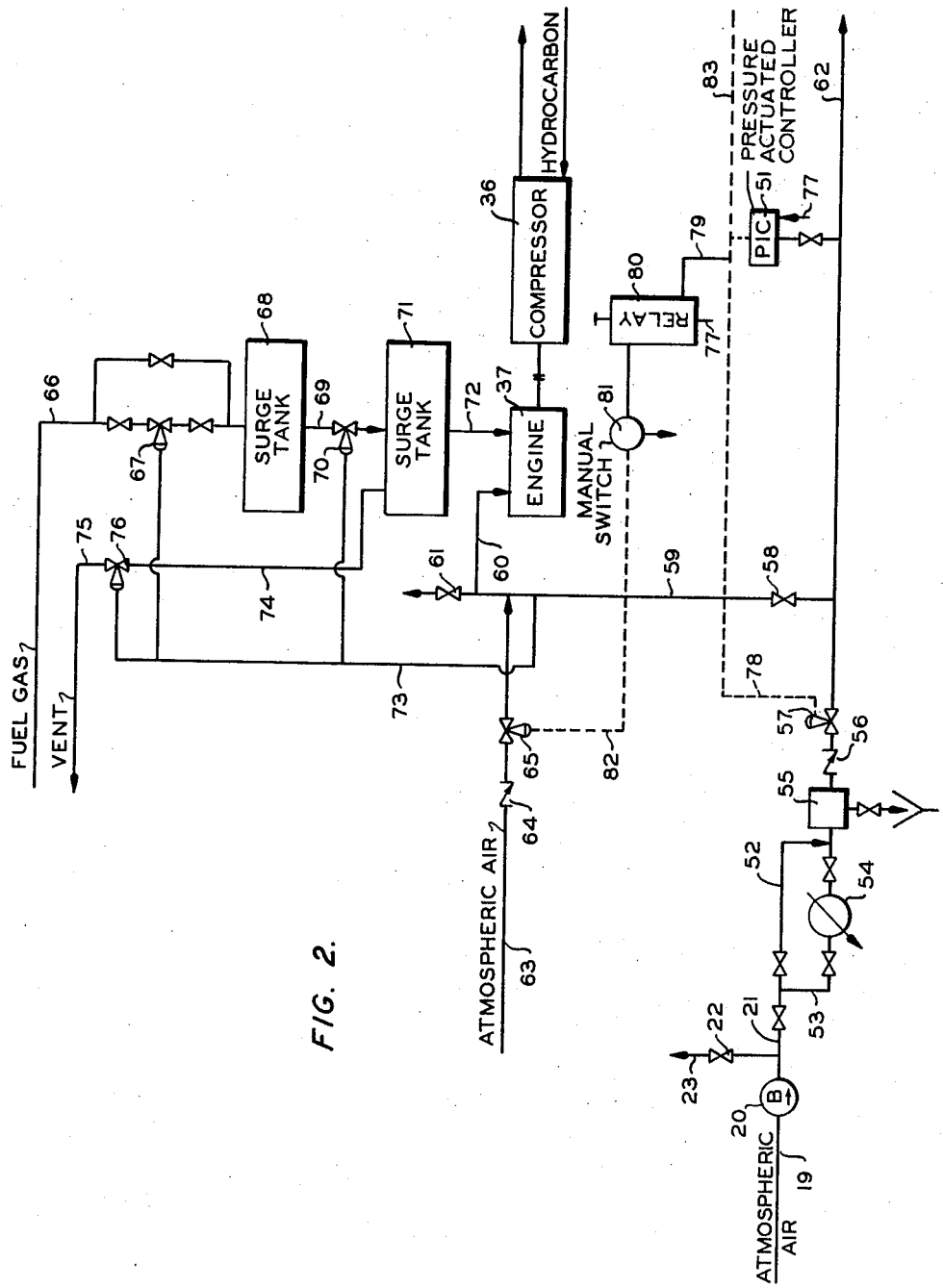

2,905,627

HYDROCARBON CONVERSION PROCESS WITH AN IMPROVED CONTROL SYSTEM AND METHOD OF OPERATING SUPERCHARGED ENGINES

Henry H. Lee and Richard F. Berger, Woods Cross, Utah, and Forrest E. Gilmore, Bartlesville, Okla., assignors to Phillips Petroleum Company, a corporation of Delaware Application March 20, 1957, Serial No. 647,385

10 Claims. (Cl. 208—103)

This invention relates to supercharged internal combustion engines and to their operation. More specifically, this invention relates to improvements in an air supply arrangement for supercharged internal combustion engines such as those used, for example, to drive compressors employed to compress light hydrocarbon gases in refinery gas recovery plants. In accordance with one specific aspect, this invention relates to automatic control means and method for operating supercharged internal combustion engines on either compressed or atmospheric air at high elevations. In acordance with a more specific aspect, this invention relates to method and apparatus for automatically controlling the operation of stationary supercharged internal combustion engines, such as those utilized as prime movers for gas compressors employed in refinery gas recovery plants located at high elevations, wherein in the event of supercharging or plant instrument air failure, for example, the system is automatically placed on atmospheric air operation to supply the engines, thereby preventing shut-down of the engine-compressor units, and, at the same time, the flow of fuel to the engines is proportionally adjusted by reducing the pressure of the fuel in response to air pressure passed to the cylinders of the supercharged internal combustion engines.

In the operation of gas compressors driven by internal combustion engines, such as the compressors being utilized for the compression of light hydrocarbon gases in refinery gas plants, for example, it is desirable to maintain the power output of the prime mover at as high a level as possible in order to handle the maximum volume of gas. Ordinarily unsupercharged gas engine power output rating is measured at sea level. At higher altitudes or elevations, the power output becomes progressively less; however, the loss of engine power output can be overcome by supercharging. The principle of supercharging an internal combustion engine to obtain greater power output, especially at high altitude operations, has been utilized to a considerable extent. Supercharging can be accomplished by employing a blower or compressor to increase the pressure of the air or mixture passed to the engine manifold, thereby increasing the volume of air or mixture charged to the cylinders of the engine during the intake cycles. The blower or compressor employed to provide compressed air for the engine can be either integral with the engine or the blower can be operated by a separate prime mover; however, engine installations utilizing compressed air for supercharging derived from a blower driven by a separate prime mover are always subject to engine shutdown due to lack of air if, for example, there is supercharging air failure.

Accordingly, an object of this invention is to provide an improved air supply arrangement for supercharged internal combustion engines. Another object of this invention is to provide a method for supercharging internal combustion engines utilized to drive gas plant compressors in refineries located at high elevations. Another object of this invention is to provide an improved method of operating supercharged internal combustion engines supplied with compressed air by a blower or compressor driven by a separate prime mover wherein the supercharged engine is not shut-down due to supercharging air failure. Another object of this invention is to provide automatic control means for regulating the flow of air and fuel supplied to supercharged internal combustion engines in response to the pressure of the air existing in the engine intake. Another object of this invention is to provide automatic control means for supercharged internal combustion engines wherein the supercharger is operated by a separate prime mover and, in the event of supercharger failure, the engine is automatically placed on atmospheric air operation without shutting down the engine. Another object of this invention is to provide means for rapidly changing from atmospheric air operation of an engine to supercharging operation when supercharging air is available so that automatic operation will be effected. Other aspects, objects as well as the several advantages of this invention are apparent from a study of the disclosure, the drawings, and the appended claims.

In accordance with a broad concept of the present invention, we provide a method for operating internal combustion engines normally supplied with supercharging air, wherein in the event of supercharging air failure, for example, comprising of directing atmospheric air automatically into the engine intake in response to drop engine air intake pressure, and proportionally decreasing the pressure on the fuel supply to the engine in response to drop of engine air intake pressure. In accordance with another important concept of our invention, we provide a method of operating internal combustion engines associated with chemical processes, for example, utilizing a combustion supporting gas such as air under pressure, comprising passing excess air from the process to the air intake of an internal combustion engine as a source of supercharging air, and, in the event of supercharging air failure, passing atmospheric air automatically into the engine air intake in response to engine intake air pressure drop, and proportionally reducing the pressure of fuel passed to the engine in response to drop of engine air intake pressure.

In accordance with one specific embodiment of the present invention, we provide a method for directing supercharging air, atmospheric air and fuel into the intake manifold of internal combustion engines utilized to drive compressors, for example, for the compression of light gases produced in a catalytic hydrocarbon conversion process, preferably a Thermofor Catalytic Cracking process, which utilizes air under pressure as a combustion supporting medium to reactivate catalyst, for example, comprising passing excess air under pressure, which is not utilized in the conversion process, from an independently driven blower to the air intake manifold of internal combustion engines as a source of supercharging air, and, in the event of supercharging air failure, for example, atmospheric air is immediately directed automatically into the air intake manifold of the engines in response to drop in engine air intake pressure, thereby avoiding shut-down of the engine-compressor units, and proportionally reducing the pressure of the fuel passed to the engines for internal combustion in response to the drop in pressure of air passed to the engine intake manifold.

In accordance with another specific embodiment of the present invention, we provide control apparatus for automatically controlling the flow of fuel and air passed to the intake of supercharged internal combustion engines, especially in the event of supercharging air failure, for example, comprising, in combination, fluid pressure actuated valve control means located in the conduits passing supercharging air and atmospheric air to the engine air intake manifold, pressure controlling means operatively connected to the engine air intake and the fluid pressure actuated control valve means located in the supercharging and atmospheric air conduits and to the source of fluid pressure utilized to actuate the control valves, and control valve means located in the engine fuel inlet conduit operative in response to changes in air pressure in the engine air intake manifold.

Better understanding of our invention will be apparent from a study of the specification, read in connection with the accompanying drawings, wherein Figure 1 is a schematic representation of a Thermofor Catalytic Cracking process located at approximately 4,200 feet above sea level employing our invention.

Figure 2 is a detailed schematic representation of the control system of the present invention for controlling the flow of fuel and air to supercharged internal combustion engines in the event of supercharging air failure.

Referring now to Figure 1, high boiling hydrocarbon reactants, which may be vaporized and/or liquid charge, are passed via conduit 10 to reaction zone 11 wherein the reactant is contacted with a downwardly moving gravitating bed of catalyst introduced into reaction zone 11 by conduit 12. Lower boiling hydrocarbon product is disengaged from reaction zone 11 and passed via conduit 13 to fractionator 14 for separation into various fractions to be described hereinafter.

Deactivated catalyst is disengaged from reaction zone 11 and passed via conduit 15 to kiln or regeneration zone 16 wherein the deactivated catalyst is regenerated by burning off deposited carbonaceous materials on the catalyst by contacting the catalyst with a combustion supporting gas such as air introduced by conduit 17, and the products of combustion, which may also contain catalyst fines, are removed from kiln 16 via conduit 18 to subsequent processing (not shown) to recover catalyst fines carried along with the combustion gases, for example. The combustion supporting gas employed for catalyst regeneration is obtained by passing atmospheric air through conduit 19 to a blower 20, or compressor wherein the pressure of the air is elevated a few pounds, and discharged from blower 20 through conduit 21, valve 22, conduit 23, and then through conduit 17 and introduced into kiln 16. If desired, a portion of the air discharged from blower 20 may be also used as catalyst lift gas and passed via conduit 24 to catalyst lift pot 25, to raise the catalyst through conduit 26 and disengaging drum 27, wherein the catalyst is separated from the lift gas and passed via conduit 12 to reactor 11, and the lift gas exhausted to the atmosphere through conduit 28.

The lower boiling hydrocarbon products produced in reactor 11 are passed through conduit 13 to fractionator 14 wherein liquid products such as gasoline, light cycle oil, and heavy cycle oils are removed by conduits 30, 31, and 32, respectively. Fractionator 14 is operated in a conventional manner. A gas comprised principally of $C_1$ to $C_5$ hydrocarbons and inert materials is removed from fractionator 14 via conduit 33 and passed along with other light hydrocarbon gases, for example, derived from other sources in the refinery, which are introduced through conduit 34 into conduit 33, and the gaseous mixture is then passed via conduit 35 to compressor 36 driven by internal combustion engines 37 wherein the gases are compressed and passed through conduit 38 to a gas recovery zone 39. Gas recovery zone 39 may comprise fractionation, solvent extraction and the like to effect a separation of the various components of the product gas. Light hydrocarbon gases such as propane, butane, and the like are removed from zone 39 and passed to subsequent processing (not shown). Fuel gas separated in zone 39 is removed through conduit 40 and part can be passed via conduit 41 for other use in the refinery, if desired, and a portion is passed through conduit 42 having a control valve 43 fuel pressure reducing means or vent means (not shown) therein to engines 37 for internal combustion. Control valve 43 operates in direct response to the air pressure existing in the air intake of engines 37 thereby proportionally controlling the rate of fuel introduction into engines 37 by reducing the pressure of the fuel in response to the engine air inlet pressure, which is part of our invention and will be more fully described hereinafter.

In accordance with our invention, a portion of the air exhausted under pressure from blower 20, preferably the excess air not needed to reactivate the catalyst in kiln 16 and for use as catalyst lift gas, is passed through conduit 44, control valve 45, and conduit 46, and introduced into engine 37 air intake manifold 47 to supercharge engines 37. Atmospheric air can be introduced when needed into air intake manifold 47 of engines 37 through conduit 48, control valve 49 and conduit 50. A pressure indicating controller 51 which senses the air pressure existing in the engine intake, controls the setting of valves 45 and 49 by regulating the amount of plant instrument air (not shown) passed to each control valve. Normally engines 37 are supercharged by being supplied air under pressure from blower 20, and thus valve 45 is normally open, while control valve 49 is normally closed. Therefore, in the event of blower 20 failure, for example, or there is no excess supercharging air available, or there is plant instrument air failure, a signal from controller 51 causes valve 49 to open and valve 45 to close, thereby placing engines 37 on atmospheric air operation and avoiding a shut-down of compressors 36. Also, since control valve 43 operates in direct response to the air pressure existing in the engine air intake, fuel is proportionally controlled by throttling valve 43 in response to drop in air pressure in the engine air intake. For example, with the lower pressure atmospheric air in service in the event of blower failure, for example, valve 43 is moved toward the closed position thereby reducing the pressure on the fuel passed to engines 37. Therefore, the engines are always operating in the most efficient manner possible by the practice of the present invention. While the present invention has been specifically described in connection with the operation of a Thermafor Catalytic Cracking process, it should be realized that the invention can also be advantageously employed in other hydrocarbon conversion processes, for example, that utilize and have an excess of a combustion supporting medium, such as air, under pressure, and also wherein the process utilizes internal combustion engines to drive compressors, for example, in a hydrocarbon gas recovery plant associated with the process, to supercharge the internal combustion engines employed as prime movers in the process.

Referring now to Figure 2, motor or engine 37 is an internal combustion engine of the type for internal combustion of fuel such as fuel gas, and the like, and can be provided with a carburetor or fuel pump (not shown), an intake manifold, and throttle controller lever (not shown). Engine 37 is suitably connected to compressor 36 by a drive shaft coupling and the compressor may be a positive displacement piston-type compressor a centrifugal-type compressor, or any type of compressor known in the art. We prefer to utilize the compressor to compress hydrocarbon gases or hydrogen obtained from or used in a hydrocarbon conversion process such as, for example, a Thermofor Catalytic Cracking unit, or a catalytic reforming unit, a crude distillation unit, etc. After the hydrocarbon gases are compressed, they are usually passed to a gas recovery zone so as to separate the gas into various fractions such as fuel gas (methane, ethane, ethylene, etc.), propane, butane, etc. Fuel gas, such as that obtained from the above-described gas recovery zone as well as other light hydrocarbon gases obtained in a refinery, which is under pressure, is preferably employed as fuel for the above-described supercharged engine.

Compressed or supercharging air to support combustion in the cylinders of engine 37 is preferably obtained by introducing atmospheric air through conduit 19 to compressor 20 which is operated by a separate prime mover. If desired, however, the supercharger blower employed to compress air can be driven by engine 37 itself. Compressor 20 may be any conventional type compressor, centrifugal or rotary, wherein the atmospheric air is increased a few pounds, say to 16 p.s.i.a., for example. The source of compressed air preferred for supercharging engine 37 is the excess air available from the blower normally employed to supply compressed air to the regenerator of a TCC unit to reactivate the catalyst and supply lift gas for elevating the catalyst in the TCC unit. The air is discharged from compressor 20 into conduit 21, a substantial portion of the compressed air being passed to the TCC unit by way of conduit 23, and the excess to be used as supercharging air passed through parallel conduits 52 and 53, each conduit containing manual shut-off valves therein. Conduit 53 also contains cooler 54 therein so as to reduce the temperature of the compressed air exhausted from blower 20 from approximately 150° F. to approximately 100° F. The air passed through parallel conduits 52 and 53 is combined and is then passed to oil bath filter 55 to remove dust and other impurities from the compressed air. If desired, the air cleaners can be installed on the inlet end of conduit 19 through which the atmospheric air is drawn into compressor 20. The compressed air, after being passed through oil bath filter 55, is then passed through check valve 56, control valve 57, which is normally open and the operation of which will be more fully described hereinafter, manual shut-off valve 58, and then introduced into the intake manifold of engine 37 by way of conduits 59 and 60. A back-fire relief valve 61 is provided which is in open communication with air intake lines 59 and 60 for safety purposes; i.e., as conventionally used, valve 61 opens in case of explosion in air lines 59 and 60. It is to be understood that more than one engine compressor system can be operated in parallel with engine 37 with supercharged air by passing compressed air through conduit 62 to other engine compressor units.

Engine 37 is normally operated on supercharged air as described above; however, in case of blower 20 failure, for example, engine 37 can be operated on atmospheric air as more fully described hereinafter. Atmospheric air which may be drawn through an air filter (not shown) is introduced into the intake manifold of engine 37 by passing the air through conduit 63, check valve 64, control valve 65 which is normally closed and the operation of which will be more fully described hereinafter, and conduits 59 and 60.

We prefer to utilize fuel gas as the fuel to be burned by engine 37 and the fuel gas is introduced at high pressure via conduit 66, which has control valve 67 therein, and introduced into surge tank 68 to partially reduce the pressure of the fuel gas. After partial reduction of the pressure of the fuel gas in surge tank 68, the fuel gas is removed through conduit 69, which has a control valve 70 therein, and passed to surge tank 71 wherein the pressure of the fuel gas is further reduced. The pressure of the fuel gas is reduced to approximately 18 p.s.i.a. in surge tank 68 and further reduced to about 15 p.s.i.a. in surge tank 71. The fuel gas in surge tank 71 is removed by way of conduit 72 and introduced into the cylinders of engine 37 through a suitable manifold (not shown) for internal combustion. Pressures in surge tanks 68 and 71 are controlled by pressure control valves 67 and 70, respectively, which valves decrease the pressures in the surge tanks in response to a decrease in pressure in line 73; this decrease in pressure in the surge tanks being the same amount as the decrease in pressure in line 73, when changing from supercharging to atmospheric air operation.

Normally the pressure in surge tank 68 is held only 2 or 3 pounds per square inch greater than the pressure in surge tank 71, since control valve 70 can give closer control of fuel pressure in tank 71 when the upstream pressure in line 69 is only slightly greater (that is, a small differential pressure across valve 70). Valves 67 and 70 are usually diaphragm-type valves with air pressure on one side of the diaphragm and the system downstream pressure on the opposite side of the diaphragm. The downstream pressure is ordinarily regulated by adjusting a spring means which pushes the diaphragm in the same direction as does the air pressure. Any increase in the pressure of the air, e.g.; due to supercharging, gives an identical increase of pressure in the discharge or outlet side of valves 67 and 70. Thus, the pressure on the fuel gas passed to the engine cylinders is controlled directly by the pressure of the air passed to the engine.

In the case of supercharging air failure, the pressure in tank 71 would be too high for operating at atmospheric air pressure, resulting in too rich of a mixture for engine 37. To prevent this detrimental effect, a back-pressure control valve 76, which valve is controlled by the pressure in line 73, opens to permit some fuel gas from surge tank 71 to vent from the system via lines 74 and 75. Valve 76 is always closed except when venting surge tank 71 to the proper operating pressure when passing from supercharging air operation to atmospheric air operation. This insures the supply of fuel at the proper pressure to engine 37 in the shortest possible time after switching from supercharging air to atmospheric air, which is an important feature of this invention.

From the foregoing description, it can be seen that the engine-compressor unit we use to compress hydrocarbon gases in a hydrocarbon gas recovery unit in a refinery, for example, is normally operated by supercharging the air utilized for combustion in the engine; however, on occasion, conditions may arise wherein the supercharging blower or compressor may be shut down due to mechanical failure, or there may be plant instrument air failure, or for some other reason there may not be supercharging air available. Therefore, it is to these unpredictable and unforeseen conditions that the present invention is primarily directed wherein upon such failure, the engine-compressor unit will continue to operate without being shut-down by being automatically switched to atmospheric air as a source of air to support combustion in the engine cylinders.

In accordance with the present invention, a pressure indicating controller 51 is connected to the air line leading to the air intake manifold of engine 37 and, as shown in the drawing, controller 51 is actuated by the pressure existing in conduit 62; however, the controller may be conveniently connected to the air line at any suitable point between the supercharging compressor and intake manifold of engine 37. Controller 51 controls the setting of valves 57 and 65 by regulating the amount of plant instrument air which is introduced to controller 51 by way of conduit 77 and subsequently passed to control valves 57 and 65. Controller 51 controls the setting on control valve 57, which is normally open and is preferably a diaphragm motor valve of conventional design, by regulating the flow of plant instrument air passed to the diaphragm chamber of valve 57 by way of pipe 78 which is connected to a suitable source of plant air introduced into controller 51 by way of conduit 77. However, in case of compressor 20 failure, or in case of instrument air 77 failure, valve 57 is moved to the closed position in response to a change of air pressure in the engine intake sensed by controller 51.

The signal from pressure controller 51 is also transmitted via conduit 79 through relay 80, which is connected to source of a plant instrument air by conduit 77, and thence through manual switch 81 and instrument air line 82 to control valve 65, which is preferably a diaphragm motor valve, located in atmospheric air line 63. Control valve 65 is held closed as long as the supercharger is operating and supplying engine 37 with compressed air; however, as previously pointed out, upon compressor 20 failure or instrument air failure, valve 65 is immediately moved to the open position in response to the change of air pressure as sensed by controller 51, and at the same time, valve 57 is moved to the closed position, thereby placing engine 37 automatically on atmospheric air operation without ever having caused engine 37 to be shut-down due to supercharger or instrument air failure. Also with the lower pressure atmospheric air flowing to the engine, control valves 67 and 70 are also controlled to proportionally reduce the pressure on the fuel gas passed to engine 37. It should be pointed out that more than one engine-compressor unit can be operated in parallel with the above-described system being connected to this system via conduits 62 and 83. These added systems would also operate in the above-described manner.

Thus it can be seen from the above-described operation that, by the practice of our invention, we have provided an automatic control system and method of operating stationary supercharged engines, especially those employed at high elevations in a refinery, for example, comprising automatic control of the supercharging air and atmospheric air employed as combustion air for the engines wherein upon compressed air faliure the air supply to the engine is immediately switched to atmospheric air and, at the same time, the flow of fuel gas fed to the engine cylinders is proportionally adjusted by reducing the fuel pressure in response to the pressure of the air being passed to the engine cylinders. In actual plant operations at our refinery, which is located at approximately 4,200 feet above sea level, we have found that by utilizing the automatic control system and method of the present invention, the amount of gas handled by the compressors was increased by approximately ten percent, and the installation of a third engine was avoided.

In changing from atmospheric air to supercharging air, the pressure indicating controller 51 can be manually operated to supply air pressure to lines 78 and 79, which results in the opening of valve 57 and closing of valve 65 to effect automatic operation under supercharging conditions.

As will be evident to those skilled in the art, various modifications of this invention can be made or followed in the light of the foregoing disclosure and discussion without departing from the spirit or scope of the disclosure or from the scope of the claims.

We claim:

1. In a continuous process for the conversion of high-boiling hydrocarbon reactants to lower boiling hydrocarbon products wherein said reactants are contacted at reaction temperature in a reaction zone containing a downwardly moving gravitating bed of catalytic contact material and having means associated therewith for disengaging converted products and catalysts, passing said disengaged catalyst to a regeneration zone and reactivating said catalyst by contacting said catalyst with a combustion supporting gas under pressure supplied to said zone by an independently driven blower, returning said reactivated catalyst to said reaction zone, passing said disengaged products to a fractionation zone to recover gas and liquid fractions, passing said gas to a compression zone, passing said compressed gas to a gas separation zone to recover fuel gas and other light hydrocarbon gases, passing said fuel gas recovered as fuel for internal combustion in engines utilized as prime movers for compressors in said compression zone, the improvement comprising the steps of passing excess combustion supporting gas under pressure from said process to the intake of said engines as a source of supercharging gas for combustion in said engines, directing atmospheric air into said engine intake in response to drop in gas pressure in said intake in event of supercharging gas failure, and proportionally reducing the pressure of fuel passed to said engine in response to drop in gas pressure in said engine intake.

2. In a continuous process for the conversion of high-boiling hydrocarbon reactants to lower boiling hydrocarbon products wherein said reactants are contacted at reaction temperature in a reaction zone containing a downwardly moving gravitating bed of catalytic contact material and having means associated therewith for disengaging converted products and catalyst, passing said disengaged catalyst to a regeneration zone and reactivating said catalyst by contacting said catalyst with air under pressure supplied to said zone by an independently driven blower, returning said reactivated catalyst to said reaction zone, passing said disengaged products to a fractionation zone to recover gas and liquid fractions, passing said gas to a compression zone, passing said compressed gas to a gas separation zone to recover fuel gas and other light hydrocarbon gases, passing said fuel gas recovered as fuel for internal combustion in engines utilized as prime movers for compressors in said compression zone, the improvement comprising the steps of passing excess air under pressure from said process to the air intake of said engines as a source of supercharging air for said engines, and directing atmospheric air into said engine air intake in response to drop in air pressure in said intake in event of supercharging air failure, and automatically regulating the pressure of said fuel in response to changes in air pressure in said intake of said engines.

3. In a continuous chemical process for the conversion of organic materials wherein a combustion supporting gas under pressure is utilized in said process, the improvement comprising the steps of passing a portion of said gas under pressure from said process to the intake of an internal combustion engine as a source of supercharging gas for said engine, automatically passing air into said engine intake at atmospheric pressure responsive to drop of gas pressure in said intake in the event of supercharging air failure, and reducing the pressure on the fuel to said engine in response to said engine intake pressure.

4. A method of operating internal combustion engines wherein a fuel and combustion supporting medium are supplied to the intake of such an engine, the medium being supplied under above-atmospheric pressure, the improvement comprising the steps of providing, under above-atmospheric pressure, a fuel under a pressure responsive to the pressure in said intake; providing a source of atmospheric air for use in the event of failure of supply of said medium; preventing flow from said source of atmospheric air to said engine intake employing only the pressure of said supply of said medium under above-atmospheric pressure, so as to automatically cause flow of said atmospheric air to said engine intake whenever said failure of supply of said medium occurs; and automatically regulating the pressure of said fuel responsive to changes in air pressure in said intake.

5. A method of operating an internal combustion engine wherein a fuel and a combustion supporting medium are supplied the intake of said engine, the medium being supplied under above-atmospheric pressure, the improvement comprising the steps of providing, under above-atmospheric pressure, a fuel to said engine, automatically reducing the pressure on said fuel responsive to drop of pressure in said intake; providing a source of atmospheric air for use in the event of failure of supply of said medium; preventing flow from said source of atmospheric air to said engine intake employing only the pressure of said supply of said medium under above-atmospheric pressure, so as to automatically cause flow of said atmospheric air to said engine intake whenever said failure of supply of said medium occurs; and the automatic reduction of the pressure of fuel fed to said intake.

6. A method of operating an internal combustion engine wherein fuel and air are supplied to the intake of said engine, the improvement comprising the steps of directing supercharging air under pressure into the intake of said engine; providing a source of atmospheric air for use in the event of failure of the supply of said supercharging air; preventing flow from said source of atmospheric air to said engine intake employing supercharging air; automatically directing air under atmospheric pressure into said intake upon failure of supercharging air; and automatically reducing the pressure on said fuel to said engine in response to drop of air pressure in said intake.

7. An apparatus for automatically controlling the operation of supercharged internal combustion engines comprising, in combination, an engine intake, conduit means for passing fuel under pressure to said engine intake, control valve means in said conduit operative in response to drop in said engine intake air pressure, a supercharging air blower, a second conduit means for directing air under pressure from said blower to the intake of said engine, supercharging air control valve means in said second conduit for regulating the flow of supercharging air to said engine, a third conduit means for directing atmospheric air into said engine intake, an atmospheric air control valve means in said third conduit regulating the flow of atmospheric air therefore said engine, pressure controller means responsive to said engine intake pressure for automatically opening said atmospheric air control valve means responsive to drop of pressure in said second conduit in event of failure of supply of supercharging air to said engine intake.

8. Apparatus for automatically controlling the operation of supercharged internal combustion engines comprising, in combination, an engine intake, conduit means for passing fuel under pressure to said engine intake, control valve means in said conduit operative in response to drop in said engine intake air pressure, means in said conduit at a point between said control valve means and said engine intake for releasing fuel from said conduit at said point responsive to drop of pressure in said intake, a supercharging air blower, a second conduit means for directing air under pressure from said blower to the intake of said engine, a supercharging air control valve means in said conduit for regulating the flow of supercharging air to said engine, a third conduit means for directing atmospheric air into said engine intake, an atmospheric air control valve means in said third conduit for regulating the flow of atmospheric air to said engine, pressure controller means responsive to said engine intake pressure for automatically opening said atmospheric air control valve means responsive to drop of pressure in said intake in event of failure of supply of supercharging air to said engine intake.

9. Apparatus for automatically controlling the operation of supercharged internal combustion engines comprising, in combination, an engine intake, conduit means for passing fuel to said engine intake, pressure reducing control valve means in said conduit operative in response to a decrease of said engine intake air pressure, vent means having a back pressure control valve therein operatively connected to said conduit at a point between said pressure reducing control valve means and said engine intake for releasing fuel from said conduit at said point responsive to drop of pressure in said intake, a supercharging air blower, a second conduit means for directing air under pressure from said blower to the intake of said engine, a supercharging air control valve means in said conduit for regulating the flow of supercharging air to said engine, a third conduit means for directing atmospheric air into said engine intake, an atmospheric air control valve means in said third conduit for regulating the flow of atmospheric air to said engine, pressure controller means responsive to said engine intake pressure for automatically opening said atmospheric air control valve means responsive to drop of pressure in said intake in event of failure of supply of supercharging air to said engine intake.

10. Apparatus for automatically controlling the operation of supercharged internal combustion engines comprising, in combination, an engine intake, conduit means for passing fuel to said engine intake, pressure reducing control valve means in said conduit operative in response to decrease of said engine intake air pressure, surge tank means in said conduit at a point between said pressure reducing control valve means and said engine intake for releasing fuel from said conduit at said surge tank responsive to drop of pressure in said intake, a supercharging air blower driven independently of said engine, a second conduit means for directing air under pressure from said blower to the intake of said engine, a supercharging air control valve means in said conduit for regulating the flow of supercharging air to said engine, a third conduit means for directing atmospheric air into said engine intake, an atmospheric air control valve means in said third conduit for regulating the flow of atmospheric air to said engine, pressure controller means responsive to said engine intake pressure for automatically opening said atmospheric air control valve means responsive to drop of pressure in said intake in event of failure of supply of supercharging air to said engine intake.

References Cited in the file of this patent

UNITED STATES PATENTS

| | | |
|---|---|---|
| 1,704,082 | Goode | Mar. 5, 1929 |
| 1,746,309 | Herier | Feb. 11, 1930 |